US012657913B2

(12) United States Patent
Yamashita et al.

(10) Patent No.: US 12,657,913 B2
(45) Date of Patent: Jun. 16, 2026

(54) COMPUTER VISION SYSTEM, COMPUTER VISION METHOD AND COMPUTER VISION PROGRAM

(71) Applicants: RAKUTEN GROUP, INC., Tokyo (JP); CHUBU UNIVERSITY EDUCATIONAL FOUNDATION, Kasugai (JP)

(72) Inventors: Takayoshi Yamashita, Kasugai (JP); Hironobu Fujiyoshi, Kasugai (JP); Tsubasa Hirakawa, Kasugai (JP); Mitsuru Nakazawa, Tokyo (JP); Yeongnam Chae, Tokyo (JP); Bjorn Stenger, Tokyo (JP)

(73) Assignees: RAKUTEN GROUP, INC., Tokyo (JP); CHUBU UNIVERSITY EDUCATIONAL FOUNDATION, Aichi (JP)

( * ) Notice: Subject to any disclaimer, the term of this patent is extended or adjusted under 35 U.S.C. 154(b) by 251 days.

(21) Appl. No.: 18/682,444

(22) PCT Filed: Jun. 27, 2022

(86) PCT No.: PCT/JP2022/025491
§ 371 (c)(1),
(2) Date: Feb. 9, 2024

(87) PCT Pub. No.: WO2024/003976
PCT Pub. Date: Jan. 4, 2024

(65) Prior Publication Data
US 2024/0362915 A1      Oct. 31, 2024

(51) Int. Cl.
*G06V 20/40*          (2022.01)
*G06V 10/70*          (2022.01)

(52) U.S. Cl.
CPC .............. *G06V 20/42* (2022.01); *G06V 10/70* (2022.01)

(58) Field of Classification Search
None
See application file for complete search history.

(56) References Cited

U.S. PATENT DOCUMENTS 8,233,708 B2 *   7/2012   Yamauchi ............. G06F 16/785
                                                    382/165
2020/0401808 A1 *  12/2020   Wu ..................... G06V 10/7784
2025/0037476 A1 *   1/2025   Sakata ..................... G08G 1/16

OTHER PUBLICATIONS

A. Cioppa et al., "A Context-Aware Loss Function for Action Spotting in Soccer Videos," 2020 IEEE/CVF Conference on Computer Vision and Pattern Recognition (CVPR), Seattle, WA, USA, Jun. 2020, pp. 13126-13136, doi: 10.1109/CVPR42600.2020.01314. (Cited in the specification on p. 1, line 11 to p. 2, line 1).

(Continued)

*Primary Examiner* — Leon Flores
(74) *Attorney, Agent, or Firm* — HEA Law PLLC

(57)          ABSTRACT

A computer vision system, with at least one processor configured to: acquire, from a sports match video, moving image data of a first period and moving image data of a second period; by using a first machine learning model, generate, based on the moving image data of the first period, first estimation data and second estimation data for an estimation period; by using a second machine learning model, generate, based on the moving image data of the second period, the first estimation data and the second estimation data for the estimation period; and generate determination data based on the first estimation data and the second estimation data that are output from the first machine learning model and the first estimation data and the second estimation data that are output from the second machine learning model.

8 Claims, 6 Drawing Sheets

(56)　　　　　　References Cited

OTHER PUBLICATIONS

S. Giancola and B. Ghanem, "Temporally-Aware Feature Pooling for Action Spotting in Soccer Broadcasts," 2021 IEEE/CVF Conference on Computer Vision and Pattern Recognition Workshops (CVPRW), Nashville, TN, USA, Jun. 2021, pp. 4485-4494, doi: 10.1109/CVPRW53098.2021.00506. (Cited in the specification on p. 1, line 11 to p. 2, line 1).

* cited by examiner

| SCENE TYPE | LENGTH OF MOVING IMAGE DATA |
|---|---|
| KICKOFF | 15 SECONDS |
| PENALTY | 20 SECONDS |
| GOAL | 15 SECONDS |
| YELLOW CARD | 20 SECONDS |

FIG.6

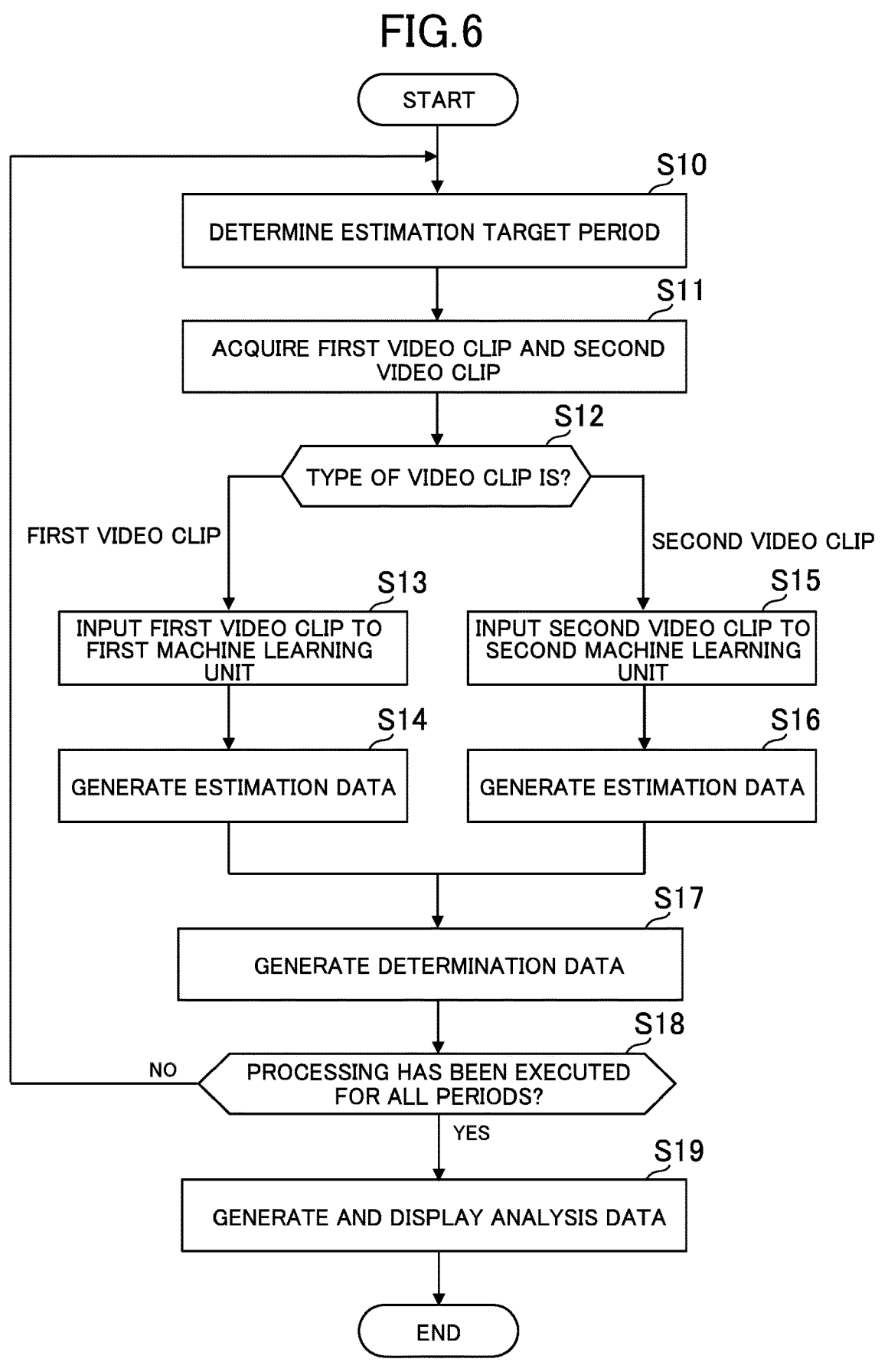

START

S10

DETERMINE ESTIMATION TARGET PERIOD

S11

ACQUIRE FIRST VIDEO CLIP AND SECOND VIDEO CLIP

S12

TYPE OF VIDEO CLIP IS?

FIRST VIDEO CLIP

SECOND VIDEO CLIP

S13

INPUT FIRST VIDEO CLIP TO FIRST MACHINE LEARNING UNIT

S15

INPUT SECOND VIDEO CLIP TO SECOND MACHINE LEARNING UNIT

S14

GENERATE ESTIMATION DATA

S16

GENERATE ESTIMATION DATA

S17

GENERATE DETERMINATION DATA

S18

NO

PROCESSING HAS BEEN EXECUTED FOR ALL PERIODS?

YES

S19

GENERATE AND DISPLAY ANALYSIS DATA

END

COMPUTER VISION SYSTEM, COMPUTER VISION METHOD AND COMPUTER VISION PROGRAM

CROSS REFERENCE TO RELATED APPLICATIONS

This application is a National Stage of International Application No. PCT/JP2022/025491 filed on Jun. 27, 2022. The contents of the above document are incorporated herein by reference in its entirety.

TECHNICAL FIELD

The present disclosure relates to a computer vision system, a computer vision method, and a computer vision program.

BACKGROUND ART

Hitherto, there has been known a technology which uses a machine learning model to estimate a scene type relating to a portion of a sports match video. Using this technology enables goal scenes, substitution scenes, and card scenes to be extracted from a soccer match video, for example, and as a result it becomes easier to edit the match video, for example, to create a highlights video (see Non Patent Literature 1 and Non Patent Literature 2).

CITATION LIST

Non Patent Literature

[NPL 1] Anthony Cioppa, Adrien Deli'ege, Silvio Giancola, Bernard Ghanem, Marc Van Droogenbroeck, Rikke Gade, and Thomas B. Moeslund. A context-aware loss function for action spotting in soccer videos. In Computer Vision and Pattern Recognition, pages 13,126-13,136, 2020.
[NPL 2] Silvio Giancola and Bernard Ghanem. Temporally-aware feature pooling for action spotting in soccer broadcasts. arXiv: 2104.06779, 2021.

SUMMARY OF INVENTION

Technical Problem

In related-art methods, there are cases in which the estimation accuracy is low because the length of the period of each scene type is not taken into account. Specifically, in a related-art method, the machine learning model is trained by using moving images of periods having a uniform length, and estimation is performed by inputting the moving images of the periods having a uniform length to the machine learning model. However, the length of each scene type is often different. For example, in a soccer match video, the length of the period of a goal scene is often longer than the length of the period of a corner kick scene. When estimation or learning is performed despite this fact without taking into consideration the length of the period of each scene type, the accuracy of the estimation as to whether the portion is of the relevant scene type may decrease.

An object of the present disclosure is to provide a computer vision system which enables a scene type relating to a portion of a sports match video to be estimated with high accuracy.

Solution to Problem

According to one embodiment of the present disclosure, there is provided a computer vision system including: a moving image data acquisition unit configured to acquire, from a sports match video, moving image data of a first period and moving image data of a second period, wherein the first period has a first length corresponding to a first scene type and includes an estimation target period, and the second period has a second length corresponding to a second scene type different from the first scene type and includes the first period, the second length being longer than the first length; a first machine learning model trained in advance by using training moving image data indicating a period having the first length, the first machine learning model being configured to generate, based on the moving image data of the first period, first estimation data as to whether the estimation target period is of the first scene type and second estimation data as to whether the estimation target period is of the second scene type; a second machine learning model trained in advance by using training moving image data indicating a period having the second length, the second machine learning model being configured to generate, based on the moving image data of the second period, the first estimation data for the estimation target period and the second estimation data for the estimation target period; and a determination data generation unit configured to generate determination data as to whether the estimation target period is of the first scene type or the second scene type based on the first estimation data and the second estimation data that are output from the first machine learning model and the first estimation data and the second estimation data that are output from the second machine learning model.

BRIEF DESCRIPTION OF DRAWINGS

FIG. 5 is a diagram for showing an example of a table used in processing by a determination data generation unit.

FIG. 6 is a flow chart for illustrating an example of details of processing executed by the estimation unit and the processing execution unit.

DESCRIPTION OF EMBODIMENTS

Description is now given of an example of an embodiment of a computer vision system according to the present disclosure. In this embodiment, a case in which the computer vision system is implemented by one computer is described, but the computer vision system may be implemented by a plurality of computers.

1. Overall Configuration of Computer Vision System

Figure 1:
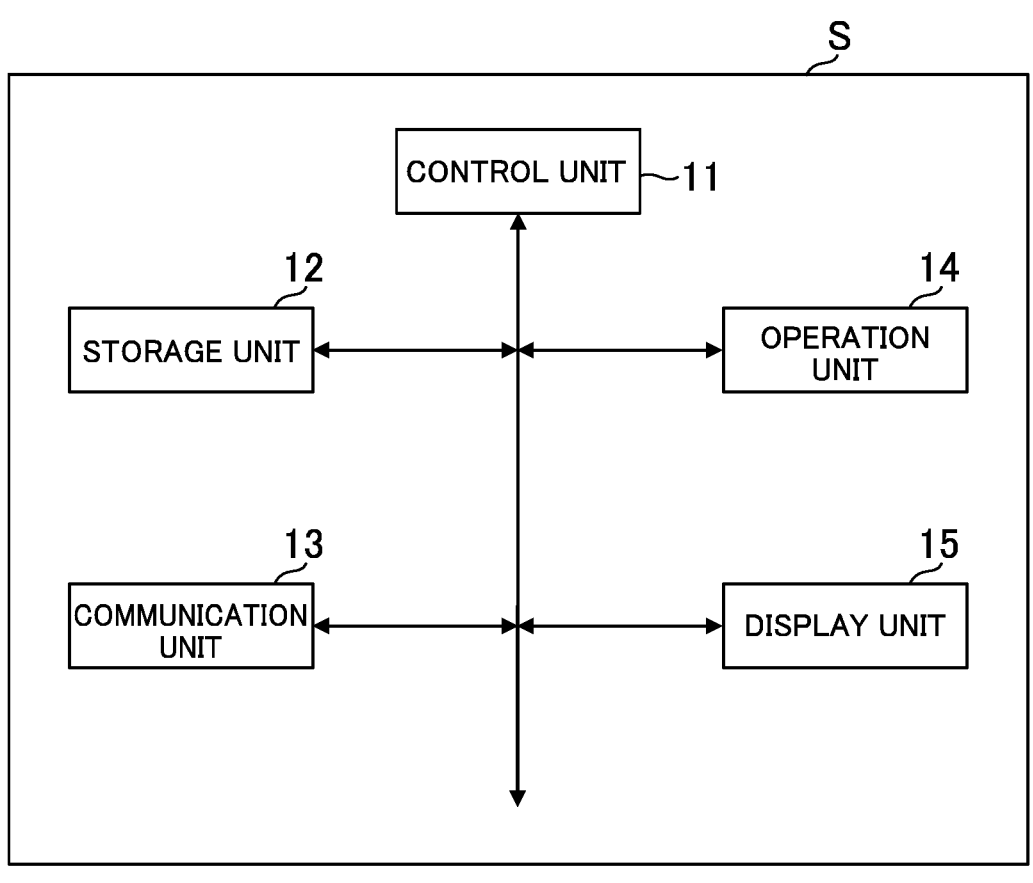
FIG. 1 is a diagram for illustrating a hardware configuration of a computer vision system according to the present disclosure.

FIG. 1 is a diagram for illustrating a hardware configuration of a computer vision system according to the present disclosure. A computer vision system S is, for example, a mobile phone (including a smartphone), a personal digital assistant (including a tablet-type computer), a personal computer, a server computer, or the like. As illustrated in FIG. 1, the computer vision system S includes a control unit 11, a storage unit 12, a communication unit 13, an operation unit 14, and a display unit 15.

The control unit 11 includes at least one processor. The control unit 11 executes processing in accordance with programs and data stored in the storage unit 12. The storage unit 12 includes a main memory unit and an auxiliary memory unit. For example, the main memory unit is a volatile memory such as a RAM, and the auxiliary memory unit is a non-volatile memory such as a ROM, an EEPROM, a flash memory, or a hard disk drive. The communication unit 13 is a communication interface for wired communication or wireless communication, and performs data communication via a network such as the Internet.

The operation unit 14 is an input device. The operation unit 14 is, for example, a touch panel, a pointing device such as a mouse, a keyboard, buttons, or the like. The operation unit 14 transmits content of an operation by the user to the control unit 11.

The display unit 15 is a display device. The display unit 15 is, for example, a liquid crystal display unit, an organic EL display unit, or the like. The display unit 15 displays images in accordance with instructions from the control unit 11.

Programs and data described as being stored into the storage unit 12 may be supplied thereto via the network. Further, the hardware configuration of each computer described above is not limited to the above-mentioned example, and various types of hardware can be applied thereto. For example, the hardware configuration may include a reading unit (e.g., an optical disc drive or a memory card slot) for reading a computer-readable information storage medium, and an input/output unit (e.g., a USB port) for inputting and outputting data to/from an external device. For instance, the program and the data that are stored on the information storage medium may be supplied to each computer via the reading unit or the input/output unit.

2. Functions Implemented in Computer Vision System

Figure 2:
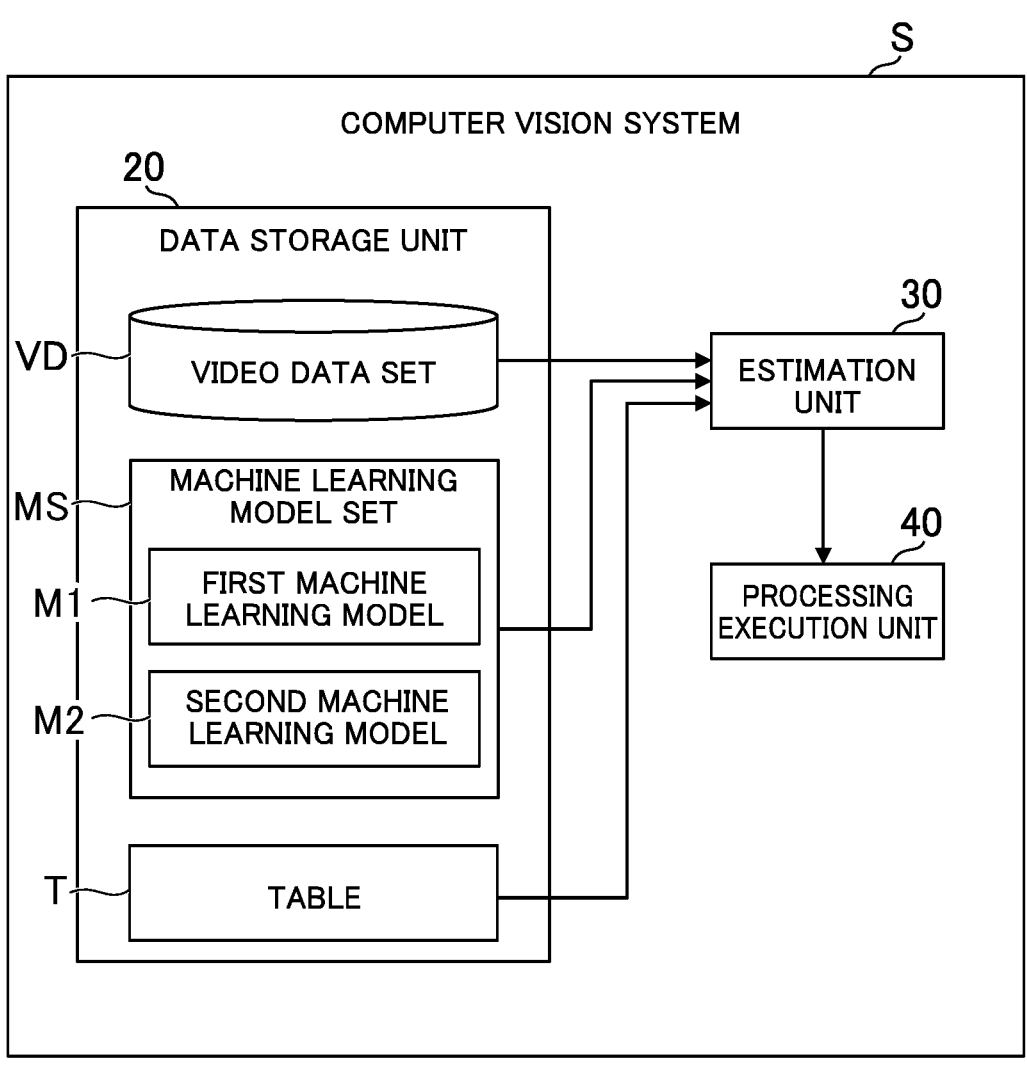
FIG. 2 is a function block diagram for illustrating an example of functions implemented in the computer vision system according to the present disclosure.

FIG. 2 is a function block diagram for illustrating an example of functions implemented in the computer vision system according to the present disclosure. The functions of the computer vision system S are implemented by the hardware illustrated in FIG. 1. Further, the functions of the computer vision system S are implemented by executing programs relating to this embodiment with the above-mentioned hardware. Those programs may be stored in a computer-readable storage medium such as a semiconductor memory, and supplied to the above-mentioned hardware from the medium.

The functions implemented in the computer vision system S are now described with reference to FIG. 2. In the computer vision system S, a data storage unit 20, an estimation unit 30, and a processing execution unit 40 are implemented. The data storage unit 20 is implemented mainly by the storage unit 12, the estimation unit 30 is implemented mainly by the control unit 11, and the processing execution unit 40 is implemented mainly by the control unit 11 and the storage unit 12. Description is now given of the data storage unit 21, the estimation unit 30, and the processing execution unit 40.

Data Storage Unit

The data storage unit 20 stores data required for the processing by the estimation unit 30. Specifically, the data storage unit 20 stores a video data set VD, a machine learning model set MS, and a table T.

The video data set VD stores a sports match video V. The match video V is subjected to processing by the estimation unit 30, which is described later. In this embodiment, the sport relating to the match video V is soccer. The sport relating to the match video V is not limited to this example, and may be another ball game played by groups of people, such as baseball, rugby, or volleyball. Further, the sport relating to the match video V may be a ball game played by one person (including a pair of people), such as tennis, table tennis, or golf, a track and field event such as a full marathon, an aquatic event such as pool swimming or open water swimming, a snow event such as Nordic skiing, or an endurance event such as a triathlon or a bicycle road race.

Figure 3:
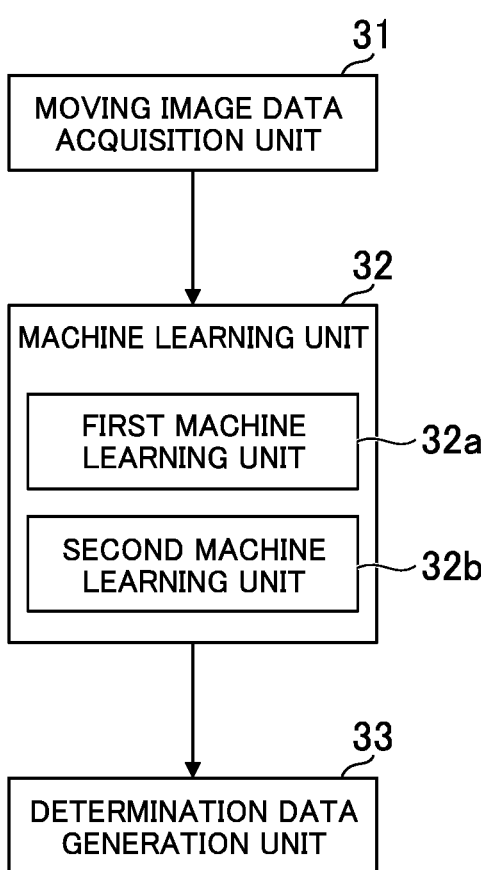
FIG. 3 is a function block diagram for illustrating an example of functions implemented by an estimation unit.

The machine learning model set MS stored in the data storage unit 20 is, specifically, a program (algorithm), parameters, and the like of the machine learning unit 32 of the estimation unit 30 (refer to FIG. 3). In this embodiment, an encoder of a transformer model is used as the machine learning model set MS (reference: Ashish Vaswani, et al., "Attention is all you need," In Advances in Neural Information Processing Systems, pages 5,998-6,008, 2017.) In addition to this, various publicly-known machine learning models used for estimating scene types relating to moving images, such as a recurrent neural network (RNN), can be used as the machine learning model set MS. The machine learning model set MS includes a first machine learning model M1 and a second machine learning model M2. The first machine learning model M1 is the program, parameters, and the like of a first machine learning unit 32a, which is described later, and the second machine learning model M2 is the program, parameters, and the like of a second machine learning unit 32b, which is described later (refer to FIG. 3 and FIG. 4).

The table T is used for processing by the estimation unit 30. Details of the table T are described later.

Estimation Unit

Figure 4:
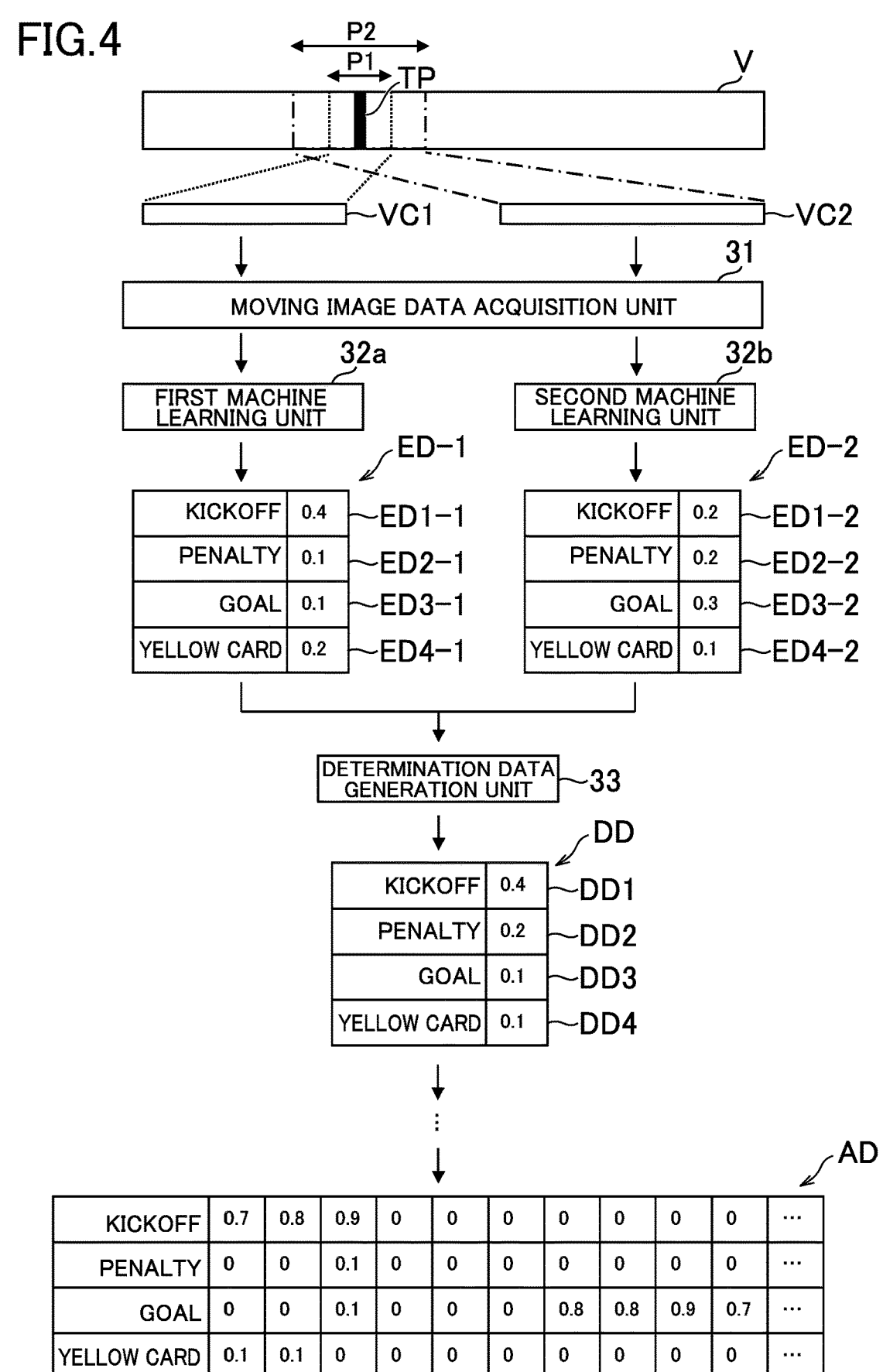
FIG. 4 is a diagram for illustrating an outline of processing executed by the estimation unit and a processing execution unit.

Description is now given of the estimation unit 30 with reference to FIG. 3 to FIG. 5 as appropriate. FIG. 3 is a function block diagram for illustrating an example of functions implemented by the estimation unit. FIG. 4 is a diagram for illustrating an outline of processing executed by the estimation unit and the processing execution unit. FIG. 5 is a diagram for showing an example of a table used in processing by a determination data generation unit.

According to the estimation unit 30 in this embodiment described below, scene types are estimated by taking the length of the period of each scene type into account, and thus the accuracy of the estimation for each scene type can be improved. That is, in the estimation unit 30 in this embodiment, when the estimation data for each scene type is generated, a machine learning model suitable for the scene type is used. Thus, with the estimation unit 30 in this embodiment, the accuracy of the estimation for each scene type is improved.

The estimation unit 30 executes processing of estimating the scene type relating to a portion of the match video V input from the data storage unit 20. As illustrated in FIG. 3, the estimation unit 30 includes a moving image data acquisition unit 31, a machine learning unit 32, and a determination data generation unit 33.

Description is now given of the moving image data acquisition unit 31 with reference to FIG. 4. The moving image data acquisition unit 31 acquires moving image data from a portion of the match video V. The match video V includes an estimation target period TP, a first period P1, and a second period P2. Further, the moving image data includes a first video clip VC1 (moving image data of the first period) and a second video clip VC2 (moving image data of the second period).

The estimation target period TP is a period for which the scene type is to be estimated, and is a period included in the first period P1 (and thus the second period P2). The estimation target period TP is a period linked to determination data DD, which is described later. That is, one piece of determination data DD corresponds to one estimation target period TP. The estimation unit 30 determines a certain period among the periods from a start time to an end time of the match video V as the estimation target period TP. In this embodiment, the length of the estimation target period TP is 0.5 second. The start time is not required to match an actual start point (that is, 0 seconds) of the match video V. Similarly, the end time is not required to match an actual end point of the match video V.

The first period P1 is a period of the first video clip VC1. Specifically, the first period P1 has a first length corresponding to a first scene type and a third scene type different from the first scene type. In this embodiment, the first length is 15 seconds, the first scene type is a kickoff scene, and the third scene type is a goal scene. As a matter of course, the first scene type and the third scene type are not limited to the above-mentioned examples, and the first length can be changed to an appropriate length in accordance with the first scene type and the third scene type. Further, in this embodiment, the number of scene types corresponding to the first length is two, but the number of scene types may be three or more. In this embodiment, the first length is determined as the optimal value for the kickoff scene and goal scene by using evaluation data.

The second period P2 is a period of the second video clip VC2. Specifically, the second period P2 has a second length corresponding to a second scene type different from the first scene type and a fourth scene type different from the second scene type. The second length is longer than the first length. That is, the second period P2 is a longer period than the first period P1. Further, the second period P2 includes the first period P1 (and thus the estimation target period TP). In this embodiment, the second length is 20 seconds, the second scene type is a penalty scene, and the fourth scene type is a yellow card scene. As a matter of course, the second scene type and the fourth scene type are not limited to the above-mentioned examples, and the second length can be changed to an appropriate length in accordance with the second scene type and the fourth scene type. Further, in this embodiment, the number of scene types corresponding to the first length is two, but the number of scene types may be three or more. Similarly to the first length, in this embodiment, the second length is determined as the optimal value for the penalty scene and yellow card scene by using evaluation data.

In this embodiment, the number of types of moving image data acquired by the moving image data acquisition unit 31 is two (first video clip VC1 and second video clip VC2), but the number of types of moving image data to be acquired may be three or more depending on the types of scene types to be estimated, the number of scene types to be estimated, and the like.

In detail, the moving image data includes a plurality of pieces of consecutive image data. Specifically, the first video clip VC1 includes a plurality of pieces of first consecutive image data, and the first video clip VC1 includes a plurality of pieces of second consecutive image data (not shown). The number of pieces of the second consecutive image data is more than the number of pieces of the first consecutive image data. Further, the plurality of pieces of first consecutive image data are included in the plurality of pieces of second consecutive image data. Incidentally, in this embodiment, the machine learning unit 32, which is described later, extracts a feature from each piece of consecutive image data included in the moving image data, and uses the extracted features to generate estimation data.

Description is now given of the machine learning unit 32 in this embodiment with reference to FIG. 4. The machine learning unit 32 generates data relating to estimation of the scene type based on the moving image data acquired by the moving image data acquisition unit 31. The machine learning unit 32 includes the first machine learning unit 32_a_ and the second machine learning unit 32_b_.

Each machine learning model of the machine learning unit 32 in this embodiment generates estimation data even for scene types that are not suitable for the machine learning model, and then, as relative values for that estimation data, generates estimation data for the scene types that are suitable for the machine learning model. Thus, in each machine learning model, estimation of the scene type corresponding to the machine learning model becomes more accurate.

Further, as described below, in the machine learning unit 32 in this embodiment, when the period corresponding to each of two scene types is the same, one machine learning model can be applied to those two scene types. As a result, the number of machine learning models to be used can be reduced, and hence memory consumption can be reduced.

The first machine learning unit 32_a_ (first machine learning model) is a machine learning model which has been trained in advance by using a training video clip of a period having the same length as the period of the first video clip VC1 (training moving image data indicating the period having the first length). For the training itself, a publicly-known method can be used, and for example, Adam, RMSProp, or the like may be used.

The first machine learning unit 32_a_ generates estimation data ED-1 for the estimation target period TP based on the first video clip VC1. The estimation data ED-1 includes first estimation data ED1-1 as to whether or not the estimation target period TP is of a kickoff scene, second estimation data ED2-1 as to whether or not the estimation target period TP is of a penalty scene, third estimation data ED3-1 as to whether or not the estimation target period TP is of a goal scene, and fourth estimation data ED4-1 as to whether or not the estimation target period TP is of a yellow card scene.

Specifically, the first estimation data ED1-1 is a value indicating a probability that the estimation target period TP is of a kickoff scene. Similarly, the second estimation data ED2-1 is a value indicating a probability that the estimation target period TP is of a penalty scene, the third estimation data ED3-1 is a value indicating a probability that the estimation target period TP is of a goal scene, and the fourth estimation data ED4-1 is a value indicating a probability that the estimation target period TP is of a yellow card scene.

The second machine learning unit 32*b* (second machine learning model) is a machine learning model which has been trained in advance by using a training video clip of a period having the same length as the period of the second video clip VC2 (training moving image data indicating the period having the second length). For the training itself, a publicly-known method can be used, and for example, Adam, RMSProp, or the like may be used.

The second machine learning unit 32*b* generates estimation data ED-2 for the estimation target period TP based on the second video clip VC2. The estimation data ED-2 includes first estimation data ED1-2 as to whether or not the estimation target period TP is of a kickoff scene, second estimation data ED2-2 as to whether or not the estimation target period TP is of a penalty scene, third estimation data ED3-2 as to whether or not the estimation target period TP is of a goal scene, and fourth estimation data ED4-2 as to whether or not the estimation target period TP is of a yellow card scene.

Specifically, the first estimation data ED1-2 is a value indicating a probability that the estimation target period TP is of a kickoff scene. Similarly, the second estimation data ED2-2 is a value indicating a probability that the estimation target period TP is of a penalty scene, the third estimation data ED3-2 is a value indicating a probability that the estimation target period TP is of a goal scene, and the fourth estimation data ED4-2 is a value indicating a probability that the estimation target period TP is of a yellow card scene.

In this embodiment, description is given of a case in which the number of machine learning models in the machine learning unit 32 is two (first machine learning unit 32*a* and second machine learning unit 32*b*), but the number of machine learning models may be three or more in accordance with the number of types of the moving image data described above.

Further, in this embodiment, the estimation data ED-1 output from the first machine learning unit 32*a* and the estimation data ED-2 output from the second machine learning model are subjected to normalization processing (not shown) before being used in the processing by the determination data generation unit 33 described later.

Description is now given of the determination data generation unit 33 with reference to FIG. 4. As described above, each machine learning model in this embodiment is suitably trained for the scene type corresponding to the machine learning model. With the determination data generation unit 33 in this embodiment, the estimation data regarding the scene type output from each machine learning model is reflected in the final determination data. Thus, it is possible to estimate each scene type with high accuracy.

The determination data generation unit 33 generates determination data DD as to whether the estimation target period TP is of a kick-off scene, a penalty scene, a goal scene, or a yellow card scene based on the estimation data ED-1 output from the first machine learning model and the estimation data ED-2 output from the second machine learning model. In detail, the determination data generation unit 33 generates determination data DD as to whether the estimation target period TP is of a kick-off scene, a penalty scene, a goal scene, or a yellow card scene based on the first estimation data ED1-1, the second estimation data ED2-1, the third estimation data ED3-1, and the fourth estimation data ED4-1 that are output from the first machine learning model and the first estimation data ED1-2, the second estimation data ED2-2, the third estimation data ED3-2, and the fourth estimation data ED4-2 that are output from the second machine learning model.

The determination data DD includes first determination data DD1 as to whether or not the estimation target period TP is of a kick-off scene, second determination data DD2 as to whether or not the estimation target period TP is of a penalty scene, third determination data DD3 as to whether or not the estimation target period TP is of a goal scene, and fourth determination data DD4 as to whether or not the estimation target period TP is of a yellow card scene. Specifically, the first determination data DD1 is a value indicating a probability that the estimation target period TP is of a kickoff scene. Similarly, the second determination data DD2 is a value indicating a probability that the estimation target period TP is of a penalty scene, the third determination data DD3 is a value indicating a probability that the estimation target period TP is of a goal scene, and the fourth determination data DD4 is a value indicating a probability that the estimation target period TP is of a yellow card scene.

More specifically, the determination data generation unit 33 calculates the first determination data DD1 and the third determination data DD3 such that an influence of one of the first machine learning unit 32*a* and the second machine learning unit 32*b* on the first determination data DD1 and the third determination data DD3 is larger than an influence of another of the first machine learning unit 32*a* and the second machine learning unit 32*b* on the first determination data DD1 and the third determination data DD3. Similarly, the determination data generation unit 33 calculates the second determination data DD2 and the fourth determination data DD4 such that an influence of the other of the first machine learning unit 32*a* and the second machine learning unit 32*b* on the second determination data DD2 and the fourth determination data DD4 is larger than an influence of the one of the first machine learning unit 32*a* and the second machine learning unit 32*b* on the second determination data DD2 and the fourth determination data DD4.

In this embodiment, the determination data generation unit 33 refers to the table T and makes a determination such that the influence of the first machine learning unit 32*a* on the first determination data DD1 and the third determination data DD3 is larger than the influence of the second machine learning unit 32*b* on the first determination data DD1 and the third determination data DD3. As shown in FIG. 5, in the table T, for each scene type, the kickoff scene is associated with the first length (15 seconds), the penalty scene is associated with the second length (20 seconds), the goal scene is associated with the first length (15 seconds), and the yellow card scene is associated with the second length (20 seconds).

Similarly, the determination data generation unit 33 refers to the table T and makes a determination such that the influence of the second machine learning unit 32*b* on the second determination data DD2 and the fourth determination data DD4 is larger than the influence of the first machine learning unit 32*a* on the second determination data DD2 and the fourth determination data DD4.

More specifically, the determination data generation unit 33 refers to the table T and selects the first estimation data ED1-1 output from the first machine learning unit 32*a* as the first determination data DD1. Similarly, the determination data generation unit 33 refers to the table T, selects the second estimation data ED2-2 output from the second machine learning unit 32*b* as the second determination data DD2, selects the third estimation data ED3-1 output from the first machine learning unit 32*a* as the third determination data DD3, and selects the fourth estimation data ED4-2 output from the second machine learning unit 32*b* as the fourth determination data DD4.

In this embodiment, a case in which the determination data generation unit 33 generates the determination data DD by referring to the table T is described, but it is not required to use the table T. For example, the determination data DD may be generated by using the maximum value or a weighted average of the estimation data output from each of the first machine learning unit 32*a* and the second machine learning unit 32*b*.

Processing Execution Unit

Description is now given of the processing execution unit 40 with reference to FIG. 3 and FIG. 4. With the processing execution unit 40 in this embodiment, a specific scene can be extracted from the match video V by using the machine learning unit 32 in this embodiment. This configuration enables goal scenes, substitution scenes, and card scenes to be extracted from a soccer match video, for example, and as a result it becomes easier to edit the match video, for example, to create a highlights video.

The processing execution unit 40 generates analysis data AD, which is the determination data DD for all the periods of the match video V, from the determination data DD for each estimation target period TP output from the estimation unit 30. The value for each scene type of the analysis data AD relating to each estimation target period TP is a value indicating a probability that the estimation target period TP is of the relevant scene type.

In FIG. 4, the analysis data AD is represented in a table format, but the final determination data DD can also be represented in a spectral format (not shown). When the analysis data AD is represented in a spectral format, the period of the match video V in which each scene type is localized can be easily grasped visually. At this time, peaks equal to or smaller than a predetermined threshold value may be removed by a non-maximum suppression (NMS) method.

Details of Processing Executed by Estimation Unit

Finally, details of the processing executed by the estimation unit 30 and the processing execution unit 40 are described with reference to FIG. 6. FIG. 6 is a flow chart for illustrating an example of details of processing executed by the estimation unit 30 and the processing execution unit 40. The processing of each step illustrated in FIG. 6 is implemented by executing the program with the hardware illustrated in FIG. 1.

The estimation unit 30 sweeps the estimation target period TP over the entire match video V, and acquires the determination data DD for each estimation target period TP of the match video V. Then, the processing execution unit 40 generates the analysis data AD from the determination data DD output from the estimation unit 30, and displays the generated analysis data AD on the display unit 15. Description is now given of each processing step by the estimation unit 30 and the processing execution unit 40.

First, the estimation unit 30 determines the estimation target period TP (Step S10). Specifically, the estimation unit 30 determines the estimation target period TP from a period from the start time to the end time of the match video V. As described above, the start time is not required to match the actual start point of the match video (that is, 0 seconds). Similarly, the end time is not required to match the actual end point of the match video.

Next, the moving image data acquisition unit 31 acquires the first video clip VC1 and the second video clip VC2 including the estimation target period TP from the match video V (Step S11). The first video clip VC1 is input to the first machine learning unit 32*a* ("first video clip" in Step S12, and the process proceeds to Step S13). The first machine learning unit 32*a* generates the estimation data ED-1 based on the input first video clip VC1 (Step S14). Similarly, the second video clip VC2 is input to the second machine learning unit 32*b* ("second video clip" in Step S12, and the process proceeds to Step S15), and the second machine learning unit 32*b* generates the estimation data ED-2 based on the input second video clip VC2 (Step S16). Then, the determination data generation unit 33 generates the determination data DD for the estimation target period TP based on the estimation data ED-1 output from the first machine learning unit 32*a* and the estimation data ED-2 output from the second machine learning unit 32*b* (Step S17). The generated determination data DD is input to the processing execution unit 40, and temporarily stored therein.

The estimation unit 30 executes the processing steps of from Step S10 to Step S17 for all periods from the start time to the end time of the match video V ("NO" in Step S18). When the estimation unit 30 finishes executing the processing steps of from Step S10 to Step S17 for all periods from the start time to the end time of the match video V ("YES" in Step S18), the processing execution unit 40 generates the analysis data AD based on the determination data DD for all periods of the match video V, displays the generated analysis data AD on the display unit 15, and ends the processing (Step S19).

In this embodiment, a case in which the processing is performed for all periods of the match video V is described, but it should be understood that the above-mentioned processing may be performed for a part of the periods of the match video V.

Further, in this embodiment, a case in which the analysis data AD, which is the determination data DD for all periods of the match video V, is generated based on determination data DD generated for each estimation target period TP is described (refer to FIG. 4), but each machine learning unit may generate pieces of estimation data for all periods of the match video V, and then the analysis data AD may be generated based on those pieces of estimation data.

According to the computer vision system of this embodiment described above, it is possible to estimate the scene type relating to a portion of a sports match video by taking into account the length of the period of each scene type.

The invention claimed is:

1. A computer vision system, comprising at least one processor configured to:

acquire, from a sports match video, moving image data of a first period and moving image data of a second period, wherein the first period has a first length corresponding to a first scene type and includes an estimation target period, and the second period has a second length corresponding to a second scene type different from the first scene type and includes the first period, the second length being longer than the first length;

generate, by using a first machine learning model trained in advance by using training moving image data indicating a period having the first length, based on the moving image data of the first period, first estimation data as to whether the estimation target period is of the first scene type and second estimation data as to whether the estimation target period is of the second scene type;

generate, by using a second machine learning model trained in advance by using training moving image data indicating a period having the second length, based on the moving image data of the second period, the first estimation data for the estimation target period and the second estimation data for the estimation target period; and generate determination data as to whether the estimation target period is of the first scene type or the second scene type based on the first estimation data and the second estimation data that are output from the first machine learning model and the first estimation data and the second estimation data that are output from the second machine learning model.

2. The computer vision system according to claim 1, wherein the determination data includes first determination data as to whether the estimation target period is of the first scene type and second determination data as to whether the estimation target period is of the second scene type, and wherein the at least one processor is further configured to:

calculate the first determination data such that an influence of one of the first machine learning model and the second machine learning model on the first determination data is larger than an influence of another of the first machine learning model and the second machine learning model on the first determination data; and calculate the second determination data such that an influence of the other of the first machine learning model and the second machine learning model on the second determination data is larger than an influence of the one of the first machine learning model and the second machine learning model on the second determination data.

3. The computer vision system according to claim 2, wherein the at least one processor is further configured to:

refer to a table associating the first scene type with the first length and associating the second scene type with the second length;

make a determination such that the influence of the first machine learning model on the first determination data is larger than the influence of the second machine learning model on the first determination data; and make a determination such that the influence of the second machine learning model on the second determination data is larger than the influence of the first machine learning model on the second determination data.

4. The computer vision system according to claim 3, wherein the at least one processor is further configured to:

refer to the table;

select the first estimation data output from the first machine learning model as the first determination data; and select the second estimation data output from the second machine learning model as the second determination data.

5. The computer vision system according to claim 1, wherein the first length corresponds to the first scene type and to a third scene type different from the first scene type, wherein the at least one processor is further configured to generate, by using the first machine learning model, the first estimation data for the estimation target period, the second estimation data for the estimation target period, and third estimation data, as to whether the estimation target period is of the third scene type based on the moving image data of the first period, wherein the at least one processor is further configured to generate, by using the second machine learning model, for the estimation target period, the first estimation data, the second estimation data, and the third estimation data based on the moving image data of the second period, and wherein the at least one processor is further configured to generate determination data as to whether the estimation target period is of the first scene type, the second scene type, or the third scene type based on the first estimation data, the second estimation data, and the third estimation data that are output from the first machine learning model and the first estimation data, the second estimation data, and the third estimation data that are output from the second machine learning model.

6. The computer vision system according to claim 1, wherein the second length corresponds to the second scene type and to a fourth scene type different from the second scene type, wherein the at least one processor is further configured to generate, by using the first machine learning model, the first estimation data for the estimation target period, the second estimation data for the estimation target period, and fourth estimation data, as to whether the estimation target period is of the fourth scene type based on the moving image data of the first period, wherein the second machine learning model is further configured to generate, by using the second machine learning model, for the estimation target period, the first estimation data, the second estimation data, and the fourth estimation data based on the moving image data of the second period, and wherein the at least one processor is further configured to generate determination data as to whether the estimation target period is of the first scene type, the second scene type, or the fourth scene type based on the first estimation data, the second estimation data, and the fourth estimation data that are output from the first machine learning model and the first estimation data, the second estimation data, and the fourth estimation data that are output from the second machine learning model.

7. A computer vision method, comprising:

acquiring, from a sports match video, moving image data of a first period and moving image data of a second period, wherein the first period has a first length corresponding to a first scene type and includes an estimation target period, and the second period has a second length corresponding to a second scene type different from the first scene type and includes the first period, the second length being longer than the first length;

generating, by using a first machine learning model trained in advance by using training moving image data indicating a period having the first length, based on the moving image data of the first period, first estimation data as to whether the estimation target period is of the first scene type and second estimation data as to whether the estimation target period is of the second scene type;

generating, by using a second machine learning model trained in advance by using training moving image data indicating a period having the second length, based on the moving image data of the second period, the first estimation data for the estimation target period and the second estimation data for the estimation target period; and generating determination data as to whether the estimation target period is of the first scene type or the second scene type based on the first estimation data and the second estimation data that are output from the first machine learning model and the first estimation data and the second estimation data that are output from second machine learning model.

8. A non-transitory computer-readable information storage medium for storing a program for causing a computer to:

acquire, from a sports match video, moving image data of a first period and moving image data of a second period, wherein the first period has a first length corresponding to a first scene type and includes an estimation target period, and the second period has a second length corresponding to a second scene type different from the first scene type and includes the first period, the second length being longer than the first length;

generate, by using a first machine learning model trained in advance by using training moving image data indicating a period having the first length, based on the moving image data of the first period, first estimation data as to whether the estimation target period is of the first scene type and second estimation data as to whether the estimation target period is of the second scene type;

generate, by using a second machine learning model trained in advance by using training moving image data indicating a period having the second length, based on the moving image data of the second period, the first estimation data for the estimation target period and the second estimation data for the estimation target period; and generate determination data as to whether the estimation target period is of the first scene type or the second scene type based on the first estimation data and the second estimation data that are output from the first machine learning model and the first estimation data and the second estimation data that are output from the second machine learning model.

* * * * *